United States Patent

Hodson et al.

[11] 3,728,389
[45] Apr. 17, 1973

[54] BIOLOGICALLY ACTIVE AMIDINES AND THEIR PREPARATION

[75] Inventors: Harold Francis Hodson; Anthony Winchester Randall, both of London, England

[73] Assignee: Burroughs Wellcome Co., North Carolina Research Triangle Park, N.C.

[22] Filed: Dec. 15, 1969

[21] Appl. No.: 885,307

Related U.S. Application Data

[63] Continuation-in-part of Ser. No. 644,064, June 7, 1967, abandoned.

[52] U.S. Cl............260/564 R, 260/501.14, 260/999
[51] Int. Cl..............................................C07c 123/00
[58] Field of Search......................260/564 R, 501.14

[56] References Cited

FOREIGN PATENTS OR APPLICATIONS 476,611  12/1967  Great Britain..........................260/564
654,521  6/1951  Great Britain..........................260/564

*Primary Examiner*—Leon Zitver
*Assistant Examiner*—Gerald A. Schwartz
*Attorney*—Sewall P. Bronstein and Donald Brown

[57] ABSTRACT

Amidine compounds of the formula

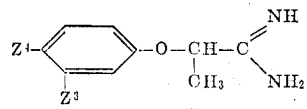

in which one of $Z^3$ and $Z^4$ is halogen, hydrogen, trifluoromethyl or lower alkoxy when the other is hydrogen; salts of these compounds; their synthesis; and pharmaceutical preparations thereof. Said compounds are useful in the treatment of cardiac arrhythmias.

10 Claims, No Drawings

BIOLOGICALLY ACTIVE AMIDINES AND THEIR PREPARATION

CROSS-REFERENCE TO RELATED APPLICATION

This application is a continuation-in-part of our copending application Ser. No. 644,064 filed June 7, 1967, now abandoned.

This invention relates to propionamidines, pharmaceutical compositions containing them and their preparation.

The pharmacological effects of phenoxyacetamidines have been investigated by a number of workers. Thus the complete specification of U.K. Pat. No. 476,611 discloses 3-methoxy- and 4-methoxyphenoxyacetamidine as 'useful therapeutics,' and the complete specification of U.K. Pat. No. 654,521 discloses phenoxyacetamidine and 4-chlorophenoxyacetamidine as capable of increasing the amplitude of contraction of the heart of animals to which they are administered. Further work on this class of compounds was carried out by Craver, B.N. et al. (J. Pharm. & Exp. Ther., 99, (1950), 353) who also investigated the cardiac activity of 4-chlorophenoxyacetamidine, and the 3-nitro analogue.

It has now been found that the phenoxypropionamidines of formula (I) and acid addition salts thereof reduce the central and peripheral levels of catecholamines, for example the level of noradrenaline in the heart and brain, with little or no depressant action on sympathetic tone. The compounds are therefore useful in the treatment or prophylaxis of conditions where catecholamines play a deleterious role, for example in cardiac arrhythmias. The compounds of formula (I) may, for example, therefore be used in the treatment of ventricular fibrillation.

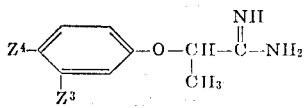

(I)

In formula (I):
one of $Z^3$ or $Z^4$ is hydrogen, halogen, alkoxy having one to four carbon atoms, or trifluoromethyl when the other is hydrogen.

The preferred compounds of formula (I) are
2-Phenoxypropionamidine,
2-m-Methoxyphenoxypropionamidine,
2-m-Chlorophenoxypropionamidine,
2p-Chlorophenoxypropionamidine,
2-m-Trifluoromethylphenoxypropionamidine,
2-m-Fluorophenoxypropionamidine,
2-m-Bromophenoxypropionamidine,
and acid addition salts thereof.

The compounds of formula (I) and their acid addition salts may be prepared by any known method for making compounds of analogous chemical structure. Thus they may be prepared by the reaction of an imidocarbonyl derivative of formula (II)

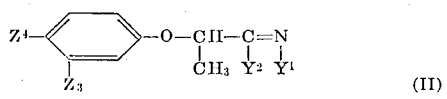

(II)

wherein $Z^4$, $Z^3$ and A are defined above and $Y^1$ and $Y^2$ are defined below, with ammonia, an ammonium salt, an ammonium derivative, thiourea, or a reducing agent as appropriate.

Thus the compounds of formula (I) may be prepared by reacting a nitrile of formula (II) wherein $Y^1$ and $Y^2$ together form a C=N bond, with an ammonium salt, thiourea or an ammonia derivative. The reaction may be carried out using an ammonium salt of an aromatic or aliphatic sulphonic acid, for example benzenesulphonic acid, p-toluenesulphonic acid or p-chlorobenzenesulphonic acid. Alternatively, ammonium thiocyanate, a substituted ammonium thiocyanate or thiourea may be used in place of the sulphonic acid derivative, and the nitrile may be replaced by another functionally reactive group which provides a source of the cyanide, for example the amide. Desirably the reaction is performed in the absence of a solvent at a temperature above 180°C. This type of reaction is well documented in the literature, see for example E.H. Rodd "Chemistry of Carbon Compounds", 1st ed. $I^4$, p. 609 et seq. The compounds of formula (I) may also be made by reacting a nitrile of formula (II) with an alkali metal amide, such as potassium amide.

This type of reaction may also be carried out using an ammonium salt and the appropriate nitrile in the presence of liquid ammonia under pressure. Any suitable ammonium salt may be used for example ammonium sulphate, chloride or thiocyanate, but ammonium bromide is preferred. A solvent for the ammonia or ammonia salt may be employed, for example ethanol or methanol, but it is not essential.

The compounds of formula (I) and their salts may further be prepared by reaction of ammonia with an imido ester or an imidothioester of formula (II) wherein $Y^1$ is hydrogen and $Y^2$ is an alkylthio or an alkoxy group having not more than six carbon atoms. A convenient alkylthio group is methylthio and a convenient alkoxy is ethoxy. The reaction is conveniently performed in the presence of a polar solvent, for example ethanol, and at least one of the reactants, that is either the ester or ammonia, is conveniently in the form of a salt. The imido ester salt may be formed from the appropriate nitrile by dissolving or suspending it in an anhydrous alkanol and treating this with dry hydrogen bromide or hydrogen chloride to form the imido ester hydrogen halide. Reaction of this compound with ammonia in alcohol then forms the amidine hydrogen halide. It is of course not necessary to isolate the imido ester but excess hydrogen halide is preferably removed. In the formation of the imido ester, no solvent is necessary other than the stoiciometric amount of alkanol, although other solvents or excess of the alkanol have been used in this type of reaction. Acids other than the hydrogen halides mentioned above have been used, but are not so convenient.

The compounds of formula (I) and their salts may furthermore be prepared by the reaction of ammonia with a thioamide of formula (II), in which $Y^1$ is hydrogen and $Y^2$ is a group —SH, according to the following equation, the tautomeric thioamide of course being shown in one form:

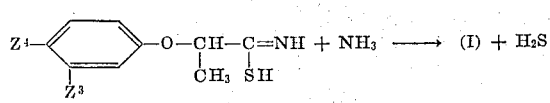

The compounds of formula (I) and their salts may also be made by the reduction of an amidoxime of formula (II) wherein $Y^1$ is —OH and $Y^2$ is —NH$_2$. The reaction is preferably performed by the use of hydrogen in the presence of an hydrogenation catalyst, for example rhodium or alumina and Raney nickel.

The compounds of formula (I) may also be prepared by reaction of the appropriate alkali metal phenate with a 2-substituted-propionamidine in which the substituent is an alkali metal-accepting atom or group such as halogen, for example by reaction of a sodium phenate with 2-chloropropionamidine in the presence of a strongly polar solvent such as acetonitrile or dimethyl formamide.

The product formed by any of the reactions will be an amidine base or an acid addition salt thereof, and these may be converted by double decomposition (metathesis) respectively into salts or into bases or other salts by reaction with an acid or salt thereof or with a base, acid or salt thereof as appropriate. The reaction may be affected in solution or on an ion exchange column, either before isolating the product or after isolation and purification. Salts of pharmaceutically acceptable acids, such as hydriodides, hydrochlorides, sulphates, lactates, citrates, tartrates, succinates, oxalates, p-toluenesulphonates, p-chlorobenzenesulphonates and maleates may thus be prepared.

The compounds of formula (I) or acid addition salts thereof may be presented for use in a pharmaceutical composition comprising the chosen compound together with an acceptable carrier therefor. The compound in the form produced in its chemical synthesis and solutions and suspensions of it in the liquids used therein are not as such pharmaceutical compositions as herein provided. The compounds are preferably presented for use as an acid addition salt in a discrete unit for oral administration, for example, as a tablet, cachet or capsule each containing a predetermined amount of the compound. It may also be presented as granules or as a powder, or as a solution or suspension in an aqueous or a non-aqueous liquid. The compositions may be made by admixture of the compound of formula (I) with the acceptable carrier using techniques of pharmacy well known in the art. Granules of the compound of formula (I) may be made by mixing the powdered compound with a binding agent, by wet granulation or granulation by precompression. The granules may be used directly, or filled into soft gelatin capsules preferably with a dispersing agent, or compressed into tablets with a lubricating and dispersing agent. The compositions may include accessory ingredients such as diluents, flavouring, and coating materials.

From studies with compounds of formula (I), it is estimated that a suitable therapeutic dose for adult human beings is from between 20 and 200 mg. per kilogram of body weight.

The present invention therefore provides, a compound of formula (I) and an acid addition salt thereof, the preparative method as hereinbefore described for making these compounds, pharmaceutical compositions containing them and preparation of the compositions. The invention also provides a method for the treatment or prophylaxis of a cardiac arrhythmia in mammals which comprises the administration to a mammal of a compound of formula (I) or an acid addition salt thereof at a therapeutic or prophylactic dose.

The following are examples of the invention, in which all temperatures are in degrees celsius.

EXAMPLE 1

A mixture of m-chlorophenol (257 g.) and anhydrous potassium carbonate (276 g.) in dry ethyl methyl ketone (300 ml.) was stirred and heated to reflux during the dropwise addition of a solution of 2-chloropropionitrile (89.5 g.) in dry ethyl methyl ketone (150 ml.) containing finely-powdered potassium iodide (1 g.). The addition took 1 hour. Stirring and heating were continued for a total of 4 hours, after which most of the ethyl methyl ketone was removed under reduced pressure. The residue was treated with water 1 l.) and extracted exhaustively with ether. The ether extract was washed 5 times with 2N-aqueous sodium hydroxide to remove the excess m-chlorophenol, dried over anhydrous sodium sulphate and evaporated. The residual oil was distilled under reduced pressure to give pure 2-m-chlorophenoxypropionitrile, b.p. 142°–144°/15 mm.

A solution of 2-m-chlorophenoxypropionitrile (9 g.) in dry chloroform (40 ml.) containing dry ethanol (2.5 g.) was saturated with dry hydrogen chloride at 0° and allowed to stand for 3 days at 2°. The solution was then treated, with cooling, with saturated ethanolic ammonia until a faint smell of ammonia persisted. The mixture was allowed to stand for 1 day at room temperature, then warmed on the steam-bath and filtered hot. The filtrate was evaporated under reduced pressure and the residue was crystallised from a mixture of ethanol and ether to give a solid, m.p. 141°–145°. Recrystallisation from a mixture of methanol and ether gave pure 2-m-chlorophenoxypropionamidine hydrochloride, m.p. 147°–148°.

An aqueous solution of the hydrochloride when treated with saturated aqueous sodium p-toluenesulphonate gave pure 2-m-chlorophenoxypropionamidine p-toluenesulphonate, m.p. 226°–227°, after recrystallisation from a mixture of ethanol and water.

EXAMPLES 2 to 7

The amidines of Examples 2 to 7 were prepared essentially by the method of Example 1. Table 2 gives the melting points of 2-aryloxypropionamidine hydrochlorides thus prepared in Examples 2 to 6, the solvents used for their crystallisation, and the boiling points of the intermediate nitriles.

Table 3 gives details of Example 7, prepared as described in Example 1, but isolated as the p-toluenesulphonate salt.

TABLE 2 — 2-Aryloxypropionamidine hydrochlorides.

$$Ar \cdot O \cdot CHMe \cdot \overset{NH}{\underset{\|}{C}} \cdot NH_2, HCl$$

| Example No. | Ar | Ar.O.CHMe.CN b.p. | n.p. | Crystallisation* solvent |
|---|---|---|---|---|
| 2 | Phenyl | 117–118°/13 mm. | 83–85° | 1 |
| 3 | m-methoxyphenyl | 152–154°/13 mm. | 147–149 | 1 |
| 4 | m-trifluoromethylphenyl | 114–116°/10 mm. | 190–191° | 2 and 1 |
| 5 | m-fluorophenyl | 120–123°/18 mm. | 153–154° | 1 and 3 |
| 6 | m-bromophenyl | 148–156°/12 mm. | 166–167° | 1 and 3 |

TABLE 3 — 2-Aryloxypropionamidine p-toluenesulphonate,

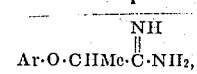

p-MeC$_6$H$_4$SO$_3$H

| Ex. No. | Ar.O.CHMe.CN Ar | m.p. b.p. | Crystall- ization* solvent |
|---|---|---|---|
| 7 | p-chlorophenyl | 114–117°/14 mm. | 224–225° | 4 |

KEY: * 1. A mixture of ethanol and ether
2. A mixture of methanol and ether
3. A mixture of propan-2-ol and ether

EXAMPLES 8 and 9

Tablets were made from the following ingredients with the quantities indicated:

| Ingredient | Example 8 | Example 9 |
|---|---|---|
| 2-m-chlorophenoxypropionamidine - base | 50 mg. | — |
| -p-toluenesulphonate salt | — | 100 mg. |
| Lactose, B.P. | 175 mg. | 100 mg. |
| Starch, B.P. | 35 mg. | 75 mg. |
| Magnesium stearate, B.P. | 4 mg. | 10 mg. |

The tablets of Example 8 were prepared by moist granulation and compression using a 10% gelatin solution as granulating agent; those of Example 9 using a 4% alcoholic solution of polyvinylpyrrolidone.

EXAMPLE 10

A mixture of 2-m-chlorophenoxypropionitrile (5.45 g.) and ammonium benzenesulphonate (5.2 g.) was stirred and heated to 270°–280°, in an atmosphere of nitrogen, for 1½ hours. The mixture was cooled and extracted with boiling water (ca. 30 ml.); the aqueous solution was cooled and filtered to give a crystalline solid, m.p. 216°–221°. Two further extractions with boiling water gave another two batches of material, both with m.p. 222°–223°. The three batches were combined and recrystallised from a mixture of ethanol and water to give pure 2-m-chlorophenoxypropionamidine benzenesulphonate, m.p. 223°–224°. This salt was identical (m.p. and mixed m.p., infrared spectrum, thin-layer chromatography) with material obtained from the hydrochloride of Example 1 by treatment with a saturated aqueous solution of sodium benzenesulphonate.

EXAMPLE 11

A solution of 2-m-chlorophenoxypropionitrile (9.1 g.) in dry pyridine (15 ml.) and dry triethylamine (7.7 g., 10.5 ml.) was treated with gaseous hydrogen sulphide during 3½ hours at room temperature. The reaction solution was evaporated to half volume under reduced pressure and poured into water (60 ml.). After 1 hour at room temperature the crystalline product was removed and dried. One recrystallisation from a mixture of ethanol and water gave pure 2-m-chlorophenoxy(thiopropionamide), m.p. 82.5°–83.5°.

A solution of 2-m-chlorophenoxy(thiopropionamide) (6.5 g.) in dry acetone (15 ml.) was treated with methyl iodide (12.7 g., 5.6 ml.). The mixture was heated to reflux for 1 hour, cooled slightly, treated with ether until just turbid, and allowed to stand at room temperature for 1 hour. The resulting crystalline product was filtered and dried in vacuo to give essentially pure S-methyl 2-m-chlorophenoxy(thiopropionimidate) hydriodide, m.p. 142°–144°.

A solution of this imidothioester hydriodide (7.2 g.) in ethanol (20 ml.) was treated with aqueous ammonia (1 ml., 0.880 ammonia solution). The solution was allowed to stand at room temperature for 30 minutes, then heated to reflux for 1 hour and evaporated to dryness under reduced pressure. The residue was recrystallised first from a mixture of ethanol, water and ether, then from a mixture of ethanol and ether, and finally from a mixture of propan-2-ol and ether to give 2-m-chlorophenoxypropionamidine hydriodide, m.p. 132°–133°.

The reaction between the imidothioester hydriodide was carried out as above, on the same scale and with essentially the same result, using saturated ethanolic ammonia instead of aqueous ammonia.

EXAMPLE 12

A mixture of 2-m-chlorophenoxy(thiopropionamide) (2.2 g.) and freshly distilled methyl p-toluenesulphonate (2.1 g.) was heated on a steam-bath for 20 minutes. The resulting crude S-methyl 2-m-chlorophenoxy(thiopropionimidate) p-toluenesulphonate was cooled to 0° and treated with aqueous ammonia (2 ml. of 0.880 ammonia solution). The mixture was shaken for 3 hours at room temperature, allowed to stand overnight and then evaporated under reduced pressure. The residue was twice recrystallised from a mixture of ethanol and water to give pure 2-m-chlorophenoxypropionamidine p-toluenesulphonate, m.p. 225°–226°.

The reaction was carried out as above, on the same scale, with essentially the same result, using saturated ethanolic ammonia (5 ml.) instead of aqueous ammonia.

EXAMPLE 13

Mercuric chloride (5.4 g.) was added to a solution of 2-m-chlorophenoxy(thiopropionamide) (2.2 g.) in dry methanol (20 ml.) and ammonia was passed through the mixture during 7 hours. The mixture was filtered and the filtrate was evaporated under reduced pressure at 25°–30°. The residue was dissolved in water, made just acid with one drop of concentrated hydrochloric acid and treated with 2N-aqueous sodium p-toluenesulphonate. The precipitated solid was filtered, washed with water and dried in vacuo; it had m.p. 197°–206°. One recrystallisation from a mixture of ethanol and water gave 2-m-chlorophenoxypropionamidine p-toluenesulphonate, m.p. 224°–225°, identical with the material of Example 1.

EXAMPLE 14

Dry hydrogen chloride (3.6 g.) was passed into an ice-cooled solution of 2-m-chlorophenoxypropionitrile (18.1 g.) in dry ethanol (5 g., 6.5 ml.). The mixture was stored for 2 days at 0° and then, with ice-cooling, treated with saturated ethanolic ammonia until a faint smell of ammonia persisted. The resulting solution was kept at room temperature for 1 day, then filtered, and the filtrate was evaporated to dryness. The residue was recrystallised three times from a mixture of ethanol and ether to give pure 2-m-chlorophenoxypropionamidine hydrochloride, m.p. 146°–148°.

EXAMPLE 15

A solution of sodium (6.5 g.) in dry methanol (150 ml.) was added dropwise to a stirred, refluxing solution of hydroxylamine hydrochloride (20.85 g.) and 2-m-methoxyphenoxypropionitrile (35.4 g.) in dry methanol (150 ml.). The mixture was stirred and refluxed for a further 14 hours, then cooled and filtered. The filtrate was treated with gaseous hydrogen chloride until acid and then diluted with ether to produce a white solid which was filtered and dried. One recrystallisation from ethanol gave 2-m-methoxyphenoxypropionamidoxime hydrochloride, m.p. 164°–165°.

A solution of 2-m-methoxyphenoxypropionamidoxime hydrochloride (2.5 g.) in dry ethanol (15 ml.) containing 5% rhodium on alumina catalyst (500 mg.) was shaken in an atmosphere of hydrogen during 6 hours at ambient temperature and pressure. The catalyst was removed by filtration and the filtrate was warmed slightly, treated with ether until just turbid, and kept overnight. The resulting crystalline product was filtered and dried in vacuo and had m.p. 144°–147°. One recrystallisation from a mixture of ethanol and ether gave 2-m-methoxyphenoxypropionamidine hydrochloride, m.p. 147°–149°, identical (infrared spectrum, mixed m.p. and thin-layer chromatography) with the material of Example 3.

We claim:

1. A propionamidine of the formula

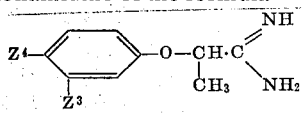

or salts thereof of pharmaceutically acceptable acids wherein one of the groups $Z^3$ and $Z^4$ is selected from the class consisting of hydrogen, halogen atoms, alkoxy groups having one to four carbon atoms and the trifluoromethyl group, when the other group is hydrogen.

2. A propionamidine as claimed in claim 1 or salts thereof of pharmaceutically acceptable acids wherein $Z^4$ is hydrogen and $Z^3$ is selected from the class consisting of hydrogen, halogen atoms, alkoxy groups having one to four carbon atoms, and the trifluormethyl group.

3. A propionamidine as claimed in claim 1 or salts thereof of pharmaceutically acceptable acids wherein the group $Z^3$ is a halogen atom selected from the class chlorine, bromine and fluorine, and $Z^4$ is hydrogen.

4. 2-m-Chlorophenoxypropionamidine or salts thereof of pharmaceutically acceptable acids.

5. A propionamidine as claimed in claim 1 which is 2-phenoxypropionamidine or salts thereof of pharmaceutically acceptable acids.

6. A propionamidine as claimed in claim 1 which is 2-m-methoxyphenoxypropionamidine or salts thereof of pharmaceutically acceptable acids.

7. A propionamidine as claimed in claim 1 which is 2-p-chlorophenoxypropionamidine and its acid addition salts.

8. A propionamidine as claimed in claim 1 which is 2-m-trifluoromethylphenoxypropionamidine and its acid addition salts.

9. A propionamidine as claimed in claim 1 which is 2-m-fluorophenoxypropionamidine and its acid addition salts.

10. A propionamidine as claimed in claim 1 which is 2-m-bromophenoxypropionamidine and its acid addition salts.

* * * * *